United States Patent
Smith et al.

(10) Patent No.: US 10,810,042 B2
(45) Date of Patent: Oct. 20, 2020

(54) DISTRIBUTED JOB SCHEDULER WITH INTELLIGENT JOB SPLITTING

(71) Applicant: RUBRIK, INC., Palo Alto, CA (US)

(72) Inventors: Schuyler Merritt Smith, Mountain View, CA (US); Patricia Ann Beekman, Waxhaw, NC (US); Nam Hyun Jo, Burlingame, CA (US)

(73) Assignee: Rubrik, Inc., Palo Alto, CA (US)

( * ) Notice: Subject to any disclaimer, the term of this patent is extended or adjusted under 35 U.S.C. 154(b) by 91 days.

(21) Appl. No.: 16/252,218

(22) Filed: Jan. 18, 2019

(65) Prior Publication Data
US 2020/0233706 A1 Jul. 23, 2020

(51) Int. Cl.
*G06F 9/48* (2006.01)
*G06F 9/455* (2018.01)

(52) U.S. Cl.
CPC ........ *G06F 9/4881* (2013.01); *G06F 9/45558* (2013.01); *G06F 9/4831* (2013.01); *G06F 2009/45575* (2013.01)

(58) Field of Classification Search
CPC ..... G06F 9/4881; G06F 9/45558; G06F 9/455
See application file for complete search history.

(56) References Cited

U.S. PATENT DOCUMENTS

| | | | | |
|---|---|---|---|---|
| 2002/0116437 A1* | 8/2002 | Kambara | ............ | G06F 9/5061 718/102 |
| 2003/0061261 A1* | 3/2003 | Greene | ............ | G06Q 10/06312 718/104 |
| 2006/0168584 A1* | 7/2006 | Dawson | ............ | G06F 11/3495 718/104 |
| 2008/0115143 A1* | 5/2008 | Shimizu | ............ | G06F 9/5066 718/105 |
| 2008/0155205 A1* | 6/2008 | Gokhale | ............ | H04L 67/2852 711/154 |
| 2015/0261580 A1* | 9/2015 | Shau | ............ | H04L 67/42 718/106 |
| 2017/0214738 A1* | 7/2017 | Agarwal | ............ | H04L 47/125 |

* cited by examiner

*Primary Examiner* — Tuan C Dao
(74) *Attorney, Agent, or Firm* — Schwegman Lundberg & Woessner, P.A.

(57) ABSTRACT

Methods and systems for improving the performance of a distributed job scheduler by dynamically splitting and distributing the work of a single job into parallelizable tasks that are executed among multiple nodes in a cluster are described. The distributed job scheduler may split a job into a plurality of tasks and assign the tasks to nodes within the cluster based on a time remaining to complete the job, an estimated time to complete the job, and a number of identified healthy nodes within the cluster. The distributed job scheduler may monitor job progress over time and adjust (e.g., increase) the number of nodes used to execute the plurality of tasks if the time remaining to complete the job falls below a threshold amount of time or if the time remaining to complete the job minus the estimated time to complete the job falls below the threshold amount of time.

20 Claims, 11 Drawing Sheets

```
Virtual Machine A, Version V7 {
    pBase,          ⟶  /snapshots/VM_A/s5/s5.full
    pF1,            ⟶  /snapshots/VM_A/s6/s6.delta
    pF2             ⟶  /snapshots/VM_A/s7/s7.delta
}
```

```
Virtual Machine A, Version V2 {
    pBase,          ⟶  /snapshots/VM_A/s5/s5.full
    pR1,            ⟶  /snapshots/VM_A/s4/s4.delta
    pR2,            ⟶  /snapshots/VM_A/s3/s3.delta
    pR3             ⟶  /snapshots/VM_A/s2/s2.delta
}
```

```
Virtual Machine A, Version V7 {
    pBase2,           ⟶  /snapshots/VM_A/s7/s7.full
}
```

```
Virtual Machine A, Version V2 {
    pBase2,           ⟶  /snapshots/VM_A/s7/s7.full
    pR11,             ⟶  /snapshots/VM_A/s6/s6.delta
    pR12,             ⟶  /snapshots/VM_A/s5/s5.delta
    pR1,              ⟶  /snapshots/VM_A/s4/s4.delta
    pR2,              ⟶  /snapshots/VM_A/s3/s3.delta
    pR3               ⟶  /snapshots/VM_A/s2/s2.delta
}
```

| Node ID | Task Queue Length | Avg. Queue Length | Time |
|---|---|---|---|
| Node1 | 20 | 18 | 08:43 |
| Node3 | 18 | 17 | 08:30 |
| Node4 | 12 | 14 | 08:30 |
| Node7 | 16 | 16 | 08:40 |

US 10,810,042 B2

DISTRIBUTED JOB SCHEDULER WITH INTELLIGENT JOB SPLITTING

BACKGROUND

Virtualization allows virtual hardware to be created and decoupled from the underlying physical hardware. For example, a hypervisor running on a host machine or server may be used to create one or more virtual machines that may each run the same operating system or different operating systems (e.g., a first virtual machine may run a Windows® operating system and a second virtual machine may run a Unix-like operating system such as OS X®. A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications executed by the virtual machine may be stored using the virtual disk. The virtual machine may be stored (e.g., using a datastore comprising one or more physical storage devices) as a set of files including a virtual disk file for storing the contents of the virtual disk and a virtual machine configuration file for storing configuration settings for the virtual machine. The configuration settings may include the number of virtual processors (e.g., four virtual CPUs), the size of a virtual memory, and the size of a virtual disk (e.g., a 2 TB virtual disk) for the virtual machine.

DETAILED DESCRIPTION

Figure 1A:
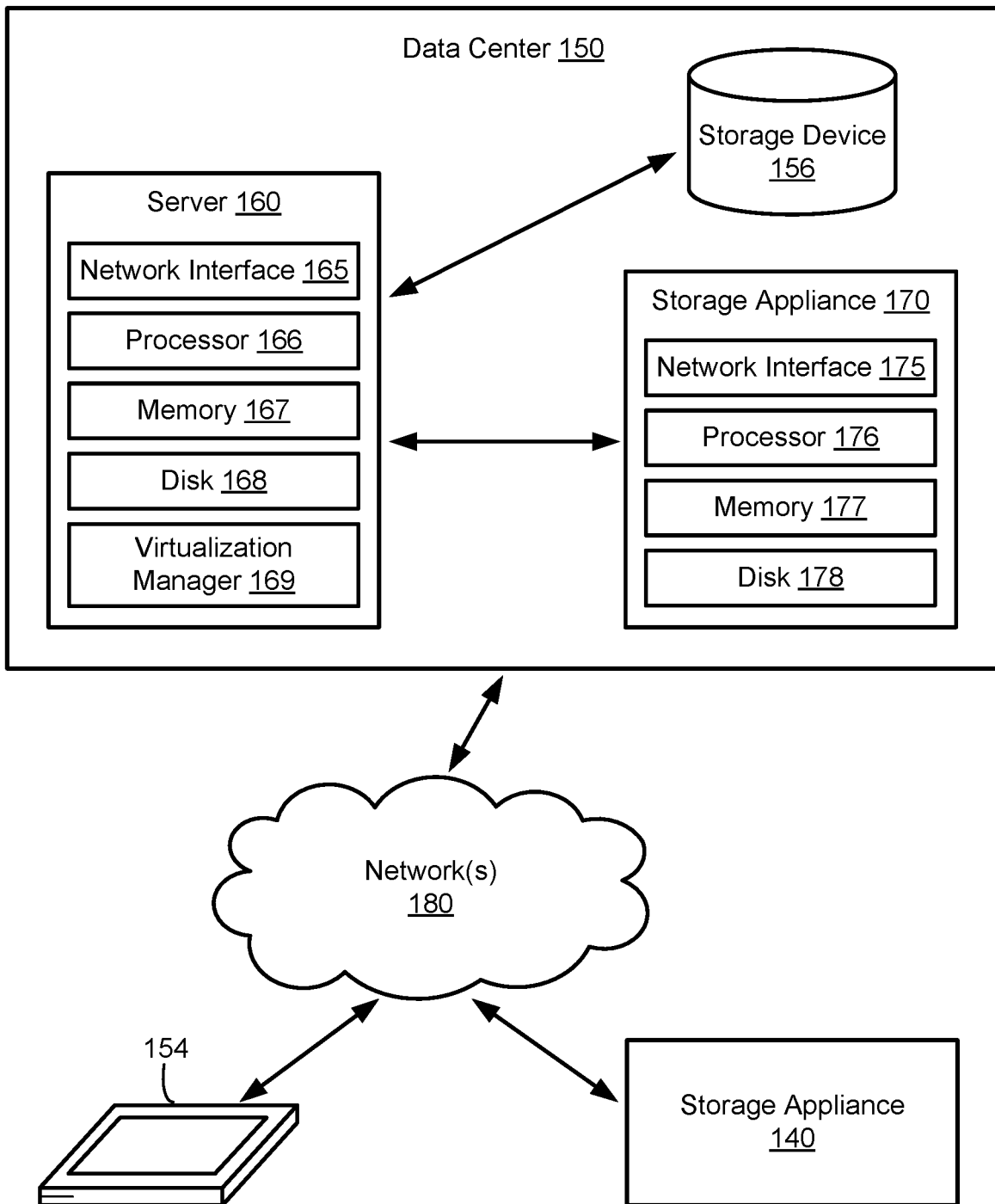
FIG. 1A depicts one embodiment of a networked computing environment.

Technology is described for improving the performance of a distributed job scheduler by dynamically splitting and distributing the work of a single job into parallelizable tasks that are executed among multiple nodes in a cluster of data storage nodes. The cluster may comprise a heterogeneous data storage cluster including a first set of data storage nodes and a second set of data storage nodes with different computing resources and/or data storage resources compared with the first set of data storage nodes. The distributed job scheduler may split a job into a plurality of tasks and assign the tasks to nodes within the cluster based on a time remaining to complete the job, an estimated time to complete the job, and a number of healthy nodes within the cluster. The number of healthy nodes may be determined based on the number of nodes within the cluster that are available to execute one or more of the tasks, the number of nodes within the cluster with at least a threshold amount of available disk space, the number of nodes within the cluster with at least a threshold amount of memory, and/or the number of nodes within the cluster that are capable of performing at least a threshold number of input/output operations per second (IOPS) or have a history of performing at least an average number of input/output operations per second. The number of nodes used to execute the plurality of tasks may be determined based on the number of healthy nodes subject to a maximum parallelism limit for the number of nodes executing the child tasks. The maximum parallelism limit for the number of nodes may be user specified or may be dynamically adjusted over time depending on the total number of nodes in the cluster. In one example, the maximum parallelism limit for the number of nodes may be periodically updated as the total number of nodes in the cluster divided by two. The maximum parallelism limit may limit the number of nodes within the cluster that are executing child tasks at the same time (e.g., only four nodes within the cluster may execute or be assigned to execute the child tasks at the same time).

As the time remaining to complete a job, the estimated time to complete the job, and the number of healthy nodes within the cluster may vary over time (e.g., due to nodes being added to or removed from the cluster or due to task failures), the distributed job scheduler may periodically adjust the number of nodes used to execute the plurality of tasks. In some embodiments, the distributed job scheduler may periodically monitor job progress (e.g., every five minutes) and increase (e.g., double) the number of nodes used to execute the plurality of tasks if the time remaining to complete the job falls below a threshold amount of time or if the time remaining to complete the job minus the estimated time to complete the job falls below a threshold amount of time. In one example, if the difference between the time remaining to complete the job minus the estimated time to complete the job is less than five minutes, then the number of nodes used to execute the plurality of tasks may be increased from four nodes to eight nodes. In this case, the distributed job scheduler may cancel some unfinished tasks running on the four nodes and reassign them to newly available nodes of the eight nodes that have greater available disk space or less CPU utilization. In another example, upon detection that the time remaining to complete a job minus the estimated time to complete the job has fallen below a threshold amount of time, then the maximum node parallelism limit for the job may be increased (e.g., doubled from four nodes to eight nodes). In some cases, upon detection that the time remaining to complete a job minus the estimated time to complete the job has risen above a threshold amount of time (e.g., there is more than thirty minutes to complete the job), then the maximum node parallelism limit for the job may be decreased (e.g., cut in half).

The distributed job scheduler may schedule and run jobs and their corresponding tasks among the data storage nodes of a cluster (e.g., the jobs may be executed or run among eight different data storage nodes within the cluster). The jobs executed by a data storage node in the cluster may include snapshot jobs to acquire and store virtual machine snapshots for one or more virtual machines over time and garbage collection jobs to free-up disk storage space within the cluster. In some embodiments, a parallel execution framework may be used in which computer program code may specify which tasks associated with a job are parallelizable and the framework may distribute the tasks across the nodes in a cluster, monitor the tasks, and handle any task or node failures that may occur during execution of the tasks.

An integrated data management and storage system may be configured to manage the automated storage, backup, deduplication, replication, recovery, and archival of data within and across physical and virtual computing environments. The integrated data management and storage system may provide a unified primary and secondary storage system with built-in data management that may be used as both a backup storage system and a "live" primary storage system for primary workloads. In some cases, the integrated data management and storage system may manage the extraction and storage of historical snapshots associated with different point in time versions of virtual machines and/or real machines (e.g., a hardware server, a laptop, a tablet computer, a smartphone, or a mobile computing device) and provide near instantaneous recovery of a backed-up version of a virtual machine, a real machine, or one or more files residing on the virtual machine or the real machine. The integrated data management and storage system may allow backed-up versions of real or virtual machines to be directly mounted or made accessible to primary workloads in order to enable the near instantaneous recovery of the backed-up versions and allow secondary workloads (e.g., workloads for experimental or analytics purposes) to directly use the integrated data management and storage system as a primary storage target to read or modify past versions of data.

The integrated data management and storage system may include a distributed cluster of storage nodes that presents itself as a unified storage system even though numerous storage nodes may be connected together and the number of connected storage nodes may change over time as storage nodes are added to or removed from the cluster. The integrated data management and storage system may utilize a scale-out node based architecture in which a plurality of data storage appliances comprising one or more nodes are in communication with each other via one or more networks. Each storage node may include two or more different types of storage devices and control circuitry configured to store, deduplicate, compress, and/or encrypt data stored using the two or more different types of storage devices. In one example, a storage node may include two solid-state drives (SSDs), three hard disk drives (HDDs), and one or more processors configured to concurrently read data from and/or write data to the storage devices. The integrated data management and storage system may replicate and distribute versioned data, metadata, and task execution across the distributed cluster to increase tolerance to node and disk failures (e.g., snapshots of a virtual machine may be triply mirrored across the cluster). Data management tasks may be assigned and executed across the distributed cluster in a fault tolerant manner based on the location of data within the cluster (e.g., assigning tasks to nodes that store data related to the task) and node resource availability (e.g., assigning tasks to nodes with sufficient compute or memory capacity for the task).

The integrated data management and storage system may apply a data backup and archiving schedule to backed-up real and virtual machines to enforce various backup service level agreements (SLAs), recovery point objectives (RPOs), recovery time objectives (RTOs), data retention requirements, and other data backup, replication, and archival policies across the entire data lifecycle. For example, the data backup and archiving schedule may require that snapshots of a virtual machine are captured and stored every four hours for the past week, every day for the past six months, and every week for the past five years.

As virtualization technologies are adopted into information technology (IT) infrastructures, there is a growing need for recovery mechanisms to support mission critical application deployment within a virtualized infrastructure. However, a virtualized infrastructure may present a new set of challenges to the traditional methods of data management due to the higher workload consolidation and the need for instant, granular recovery. The benefits of using an integrated data management and storage system include the ability to reduce the amount of data storage required to backup real and virtual machines, the ability to reduce the amount of data storage required to support secondary or non-production workloads, the ability to provide a non-passive storage target in which backup data may be directly accessed and modified, and the ability to quickly restore earlier versions of virtual machines and files stored locally or in the cloud.

FIG. 1A depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system. The one or more networks 180 may include a cellular network, a mobile network, a wireless network, a wired network, a secure network such as an enterprise private network, an unsecure network such as a wireless open network, a local area network (LAN), a wide area network (WAN), and the Internet.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The server 160 may comprise a production hardware server. The storage appliance 170 may include a data management system for backing up virtual machines, real machines, virtual disks, real disks, and/or electronic files within the data center 150. The server 160 may be used to create and manage one or more virtual machines associated with a virtualized infrastructure. The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients. One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. For example, the virtualization manager 169 may manage the provisioning of virtual machines running within the virtualized infrastructure and provide an interface to computing devices interacting with the virtualized infrastructure. The virtualization manager 169 may also perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of one or more virtual machines.

In another embodiment, the storage appliance 170 may comprise a virtual appliance that comprises four virtual machines. Each of the virtual machines in the virtual appliance may have 64 GB of virtual memory, a 12 TB virtual disk, and a virtual network interface controller. In this case, the four virtual machines may be in communication with the one or more networks 180 via the four virtual network interface controllers. The four virtual machines may comprise four nodes of a virtual cluster.

The networked computing environment 100 may provide a cloud computing environment for one or more computing devices. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business related applications to a computing device, such as computing device 154. The computing device 154 may comprise a mobile computing device or a tablet computer. The storage appliance 140 may comprise a cloud-based data management system for backing up virtual machines and/or files within a virtualized infrastructure, such as virtual machines running on server 160 or files stored on server 160.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In some cases, the snapshot may capture the state of various virtual machine settings and the state of one or more virtual disks for the virtual machine. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations), incremental files associated with commonly restored virtual machine versions, and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine information, such as identifications of the virtual machines protected and the historical versions or time machine views for each of the virtual machines protected, and allows an end user to search, select, and control virtual machines managed by the storage appliance. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

Figure 1B:
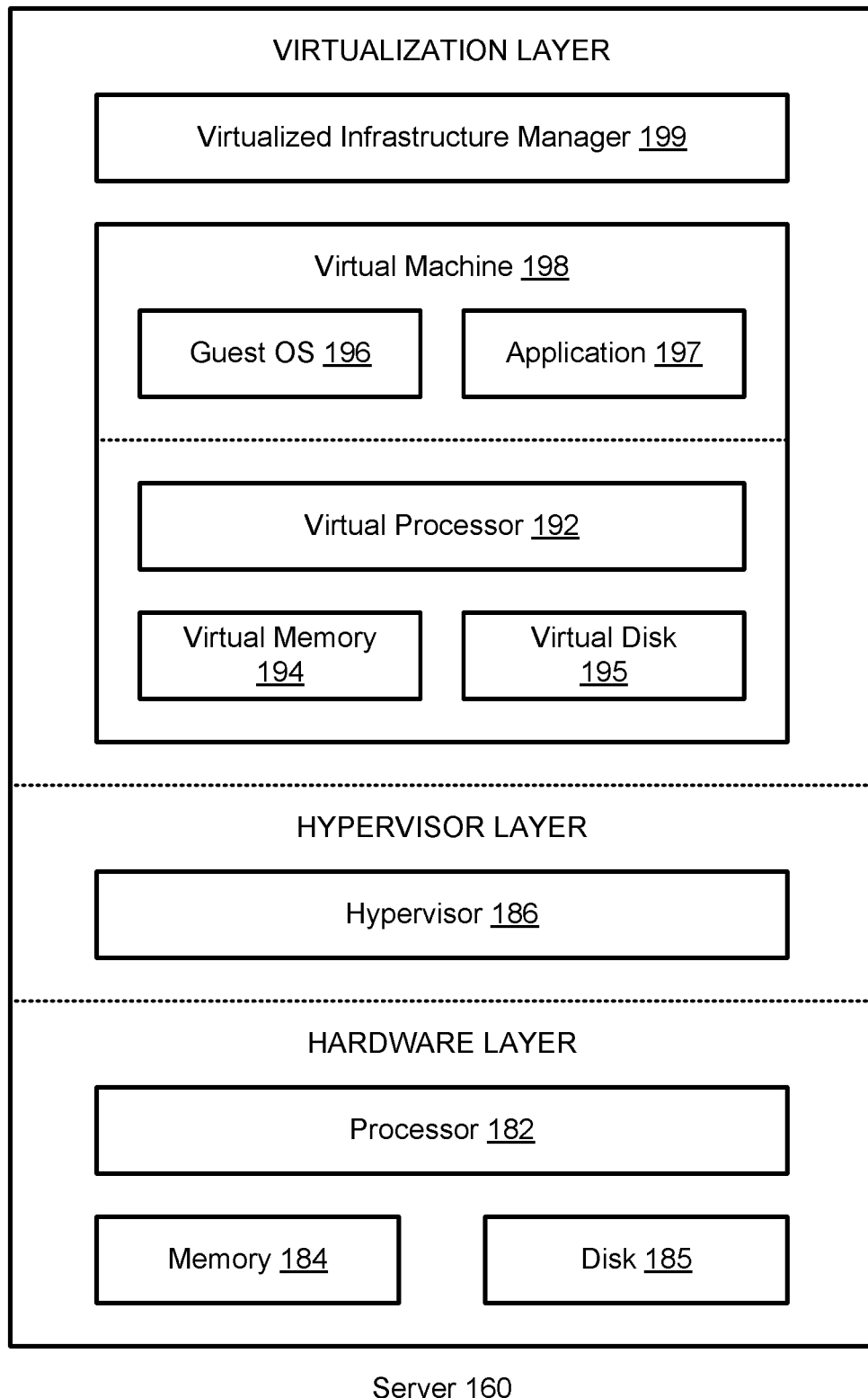
FIG. 1B depicts one embodiment of a server.

FIG. 1B depicts one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197. The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 6:30 p.m. on Jun. 29, 2017) and a second snapshot of the virtual machine may correspond with a second state of the virtual machine at a second point in time subsequent to the first point in time (e.g., 6:30 p.m. on Jun. 30, 2017).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with changed blocks stored on a virtual disk of the virtual machine that have changed since the last snapshot of the virtual machine was taken. In one embodiment, the data management application may specify a first point in time and a second point in time and the virtualized infrastructure manager 199 may output one or more changed data blocks associated with the virtual machine that have been modified between the first point in time and the second point in time.

Figure 1C:
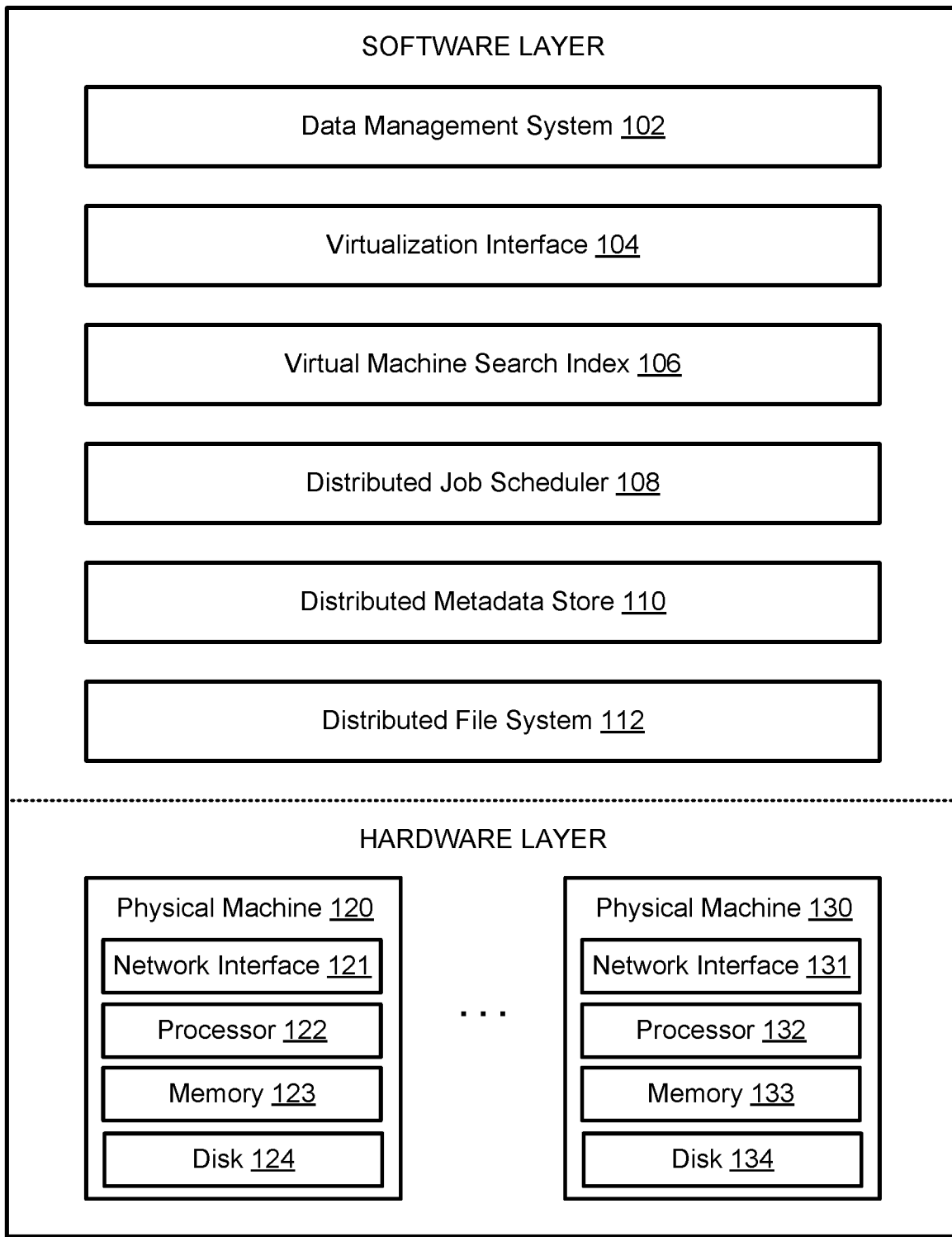
FIG. 1C depicts one embodiment of a storage appliance.

FIG. 1C depicts one embodiment of a storage appliance, such as storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a full-image snapshot of a virtual machine (e.g., /snapshots/VM_A/s1/s1.full) may be replicated and stored on three of the ten machines. In some cases, the data chunks associated with a file stored in the distributed file system 112 may include replicated data (e.g., due to n-way mirroring) or parity data (e.g., due to erasure coding). When a disk storing one of the data chunks fails, then the distributed file system may regenerate the lost data and store the lost data using a new disk.

In one embodiment, the distributed file system 112 may be used to store a set of versioned files corresponding with a virtual machine. The set of versioned files may include a first file comprising a full image of the virtual machine at a first point in time and a second file comprising an incremental file relative to the full image. The set of versioned files may correspond with a snapshot chain for the virtual machine. The distributed file system 112 may determine a first set of data chunks that includes redundant information for the first file (e.g., via application of erasure code techniques) and store the first set of data chunks across a plurality of nodes within a cluster. The placement of the first set of data chunks within the cluster may be determined based on the locations of other data related to the first set of data chunks (e.g., the locations of other chunks corresponding with the second file or other files within the snapshot chain for the virtual machine). In some embodiments, the distributed file system 112 may also co-locate data chunks or replicas of virtual machines discovered to be similar to each other in order to allow for cross virtual machine deduplication. In this case, the placement of the first set of data chunks may be determined based on the locations of other data corresponding with a different virtual machine that has been determined to be sufficiently similar to the virtual machine.

The distributed metadata store 110 may comprise a distributed database management system that provides high availability without a single point of failure. The distributed metadata store 110 may act as a quick-access database for various components in the software stack of the storage appliance 170 and may store metadata corresponding with stored snapshots using a solid-state storage device, such as a solid-state drive (SSD) or a Flash-based storage device. In one embodiment, the distributed metadata store 110 may comprise a database, such as a distributed document oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. The concepts described herein may also be applicable to managing versions of a real machine or versions of electronic files. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals. In some cases, a first version of a virtual machine corresponding with a first snapshot of the virtual machine at a first point in time may be generated by concurrently reading a full image for the virtual machine corresponding with a state of the virtual machine prior to the first point in time from the first storage device while reading one or more incrementals from the second storage device different from the first storage device (e.g., reading the full image from a HDD at the same time as reading 64 incrementals from an SSD).

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster and each node may independently determine which tasks to execute. The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The virtualization interface 104 may provide an interface for communicating with a virtualized infrastructure manager managing a virtualized infrastructure, such as the virtualized infrastructure manager 199 in FIG. 1B, and for requesting data associated with virtual machine snapshots from the virtualized infrastructure. The virtualization interface 104 may communicate with the virtualized infrastructure manager using an API for accessing the virtualized infrastructure manager (e.g., to communicate a request for a snapshot of a virtual machine).

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that includes the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

The data management system 102 may comprise an application running on the storage appliance that manages the capturing, storing, deduplication, compression (e.g., using a lossless data compression algorithm such as LZ4 or LZ77), and encryption (e.g., using a symmetric key algorithm such as Triple DES or AES-256) of data for the storage appliance 170. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

In some embodiments, a plurality of versions of a virtual machine may be stored as a base file associated with a complete image of the virtual machine at a particular point in time and one or more incremental files associated with forward and/or reverse incremental changes derived from the base file. The data management system 102 may patch together the base file and the one or more incremental files in order to generate a particular version of the plurality of versions by adding and/or subtracting data associated with the one or more incremental files from the base file or intermediary files derived from the base file. In some embodiments, each version of the plurality of versions of a virtual machine may correspond with a merged file. A merged file may include pointers or references to one or more files and/or one or more chunks associated with a particular version of a virtual machine. In one example, a merged file may include a first pointer or symbolic link to a base file and a second pointer or symbolic link to an incremental file associated with the particular version of the virtual machine. In some embodiments, the one or more incremental files may correspond with forward incrementals (e.g., positive deltas), reverse incrementals (e.g., negative deltas), or a combination of both forward incrementals and reverse incrementals.

Figure 1D:
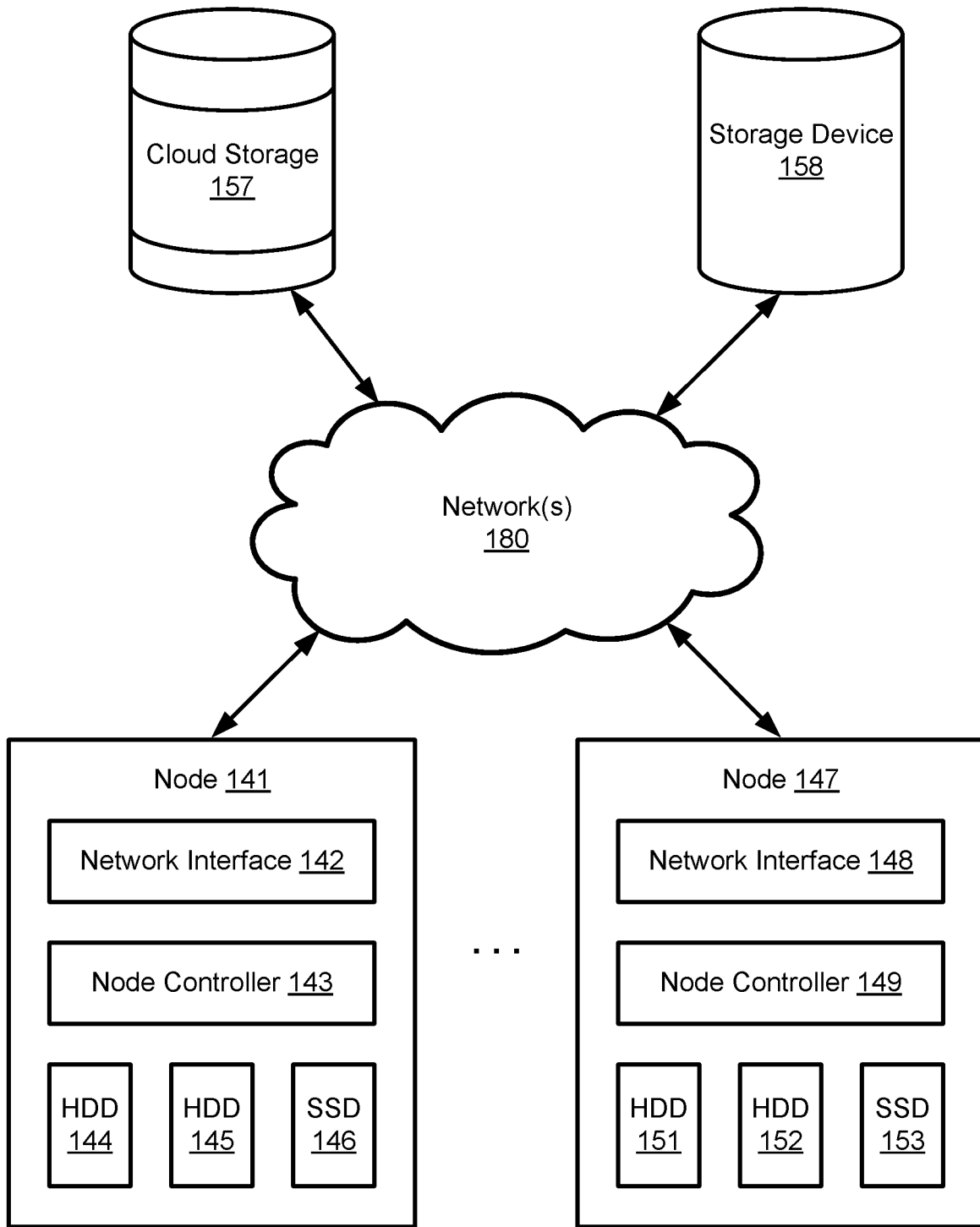
FIG. 1D depicts one embodiment of a portion of an integrated data management and storage system that includes a plurality of nodes in communication with each other and one or more storage devices.

FIG. 1D depicts one embodiment of a portion of an integrated data management and storage system that includes a plurality of nodes in communication with each other and one or more storage devices via one or more networks 180. The plurality of nodes may be networked together and present themselves as a unified storage system. The plurality of nodes includes node 141 and node 147. The one or more storage devices include storage device 157 and storage device 158. Storage device 157 may correspond with a cloud-based storage (e.g., private or public cloud storage). Storage device 158 may comprise a hard disk drive (HDD), a magnetic tape drive, a solid-state drive (SSD), a storage area network (SAN) storage device, or a networked-attached storage (NAS) device. The integrated data management and storage system may comprise a distributed cluster of storage appliances in which each of the storage appliances includes one or more nodes. In one embodiment, node 141 and node 147 may comprise two nodes housed within a first storage appliance, such as storage appliance 170 in FIG. 1C. In another embodiment, node 141 may comprise a first node housed within a first storage appliance and node 147 may comprise a second node housed within a second storage appliance different from the first storage appliance. The first storage appliance and the second storage appliance may be located within a data center, such as data center 150 in FIG. 1A, or located within different data centers.

As depicted, node 141 includes a network interface 142, a node controller 143, and a first plurality of storage devices including HDDs 144-145 and SSD 146. The first plurality of storage devices may comprise two or more different types of storage devices. The node controller 143 may comprise one or more processors configured to store, deduplicate, compress, and/or encrypt data stored within the first plurality of storage devices. Node 147 includes a network interface 148, a node controller 149, and a second plurality of storage devices including HDDs 151-152 and SSD 153. The second plurality of storage devices may comprise two or more different types of storage devices. The node controller 149 may comprise one or more processors configured to store, deduplicate, compress, and/or encrypt data stored within the second plurality of storage devices. In some cases, node 141 may correspond with physical machine 120 in FIG. 1C and node 147 may correspond with physical machine 130 in FIG. 1C.

FIGS. 2A-2F depict various embodiments of sets of files and data structures (e.g., implemented using merged files) associated with managing and storing snapshots of virtual machines.

Figures 2A, 2B, 2C:
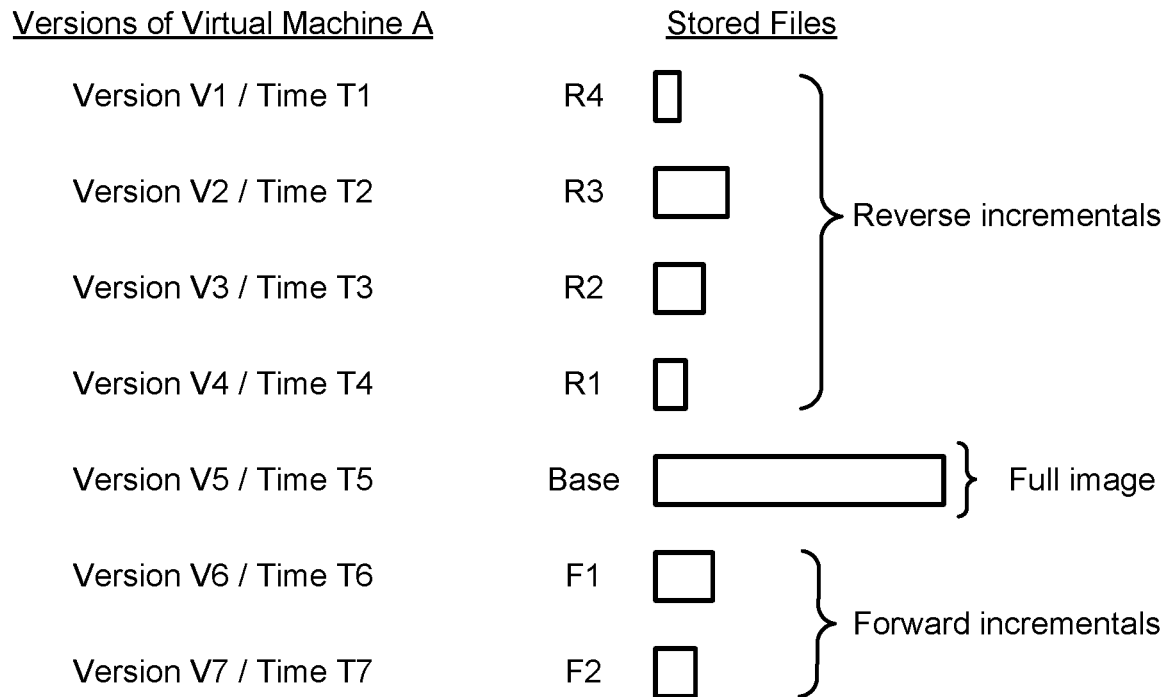
FIGS. 2A-2F depict various embodiments of sets of files and data structures associated with managing and storing snapshots of virtual machines.

FIG. 2A depicts one embodiment of a set of virtual machine snapshots stored as a first set of files. The first set of files may be stored using a distributed file system, such as distributed file system 112 in FIG. 1C. As depicted, the first set of files includes a set of reverse incrementals (R1-R4), a full image (Base), and a set of forward incrementals (F1-F2). The set of virtual machine snapshots includes different versions of a virtual machine (versions V1-V7 of Virtual Machine A) captured at different points in time (times T1-T7). In some cases, the file size of the reverse incremental R3 and the file size of the forward incremental F2 may both be less than the file size of the base image corresponding with version V5 of Virtual Machine A. The base image corresponding with version V5 of Virtual Machine A may comprise a full image of Virtual Machine A at point in time T5. The base image may include a virtual disk file for Virtual Machine A at point in time T5. The reverse incremental R3 corresponds with version V2 of Virtual Machine A and the forward incremental F2 corresponds with version V7 of Virtual Machine A. The forward incremental F1 may be associated with the data changes that occurred to Virtual Machine A between time T5 and time T6 and may comprise one or more changed data blocks.

In some embodiments, each snapshot of the set of virtual machine snapshots may be stored within a storage appliance, such as storage appliance 170 in FIG. 1A. In other embodiments, a first set of the set of virtual machine snapshots may be stored within a first storage appliance and a second set of the set of virtual machine snapshots may be stored within a second storage appliance, such as storage appliance 140 in FIG. 1A. In this case, a data management system may extend across both the first storage appliance and the second storage appliance. In one example, the first set of the set of virtual machine snapshots may be stored within a local cluster repository (e.g., recent snapshots of the file may be located within a first data center) and the second set of the set of virtual machine snapshots may be stored within a remote cluster repository (e.g., older snapshots or archived snapshots of the file may be located within a second data center) or a cloud repository.

FIG. 2B depicts one embodiment of a merged file for generating version V7 of Virtual Machine A using the first set of files depicted in FIG. 2A. The merged file includes a first pointer (pBase) that references the base image Base (e.g., via the path /snapshots/VM_A/s5/s5.full), a second pointer (pF1) that references the forward incremental F1 (e.g., via the path /snapshots/VM_A/s6/s6.delta), and a third pointer (pF2) that references the forward incremental F2 (e.g., via the path /snapshots/VM_A/s7/s7.delta). In one embodiment, to generate the full image of version V7 of Virtual Machine A, the base image may be acquired, the data changes associated with forward incremental F1 may be applied to (or patched to) the base image to generate an intermediate image, and then the data changes associated with forward incremental F2 may be applied to the intermediate image to generate the full image of version V7 of Virtual Machine A.

FIG. 2C depicts one embodiment of a merged file for generating version V2 of Virtual Machine A using the first set of files depicted in FIG. 2A. The merged file includes a first pointer (pBase) that references the base image Base (e.g., via the path /snapshots/VM_A/s5/s5.full), a second pointer (pR1) that references the reverse incremental R1 (e.g., via the path /snapshots/VM_A/s4/s4.delta), a third pointer (pR2) that references the reverse incremental R2 (e.g., via the path /snapshots/VM_A/s3/s3.delta), and a fourth pointer (pR3) that references the reverse incremental R3 (e.g., via the path /snapshots/VM_A/s2/s2.delta). In one embodiment, to generate the full image of version V2 of Virtual Machine A, the base image may be acquired, the data changes associated with reverse incremental R1 may be applied to the base image to generate a first intermediate image, the data changes associated with reverse incremental R2 may be applied to the first intermediate image to generate a second intermediate image, and then the data changes associated with reverse incremental R3 may be applied to the second intermediate image to generate the full image of version V2 of Virtual Machine A.

Figures 2D, 2E, 2F:
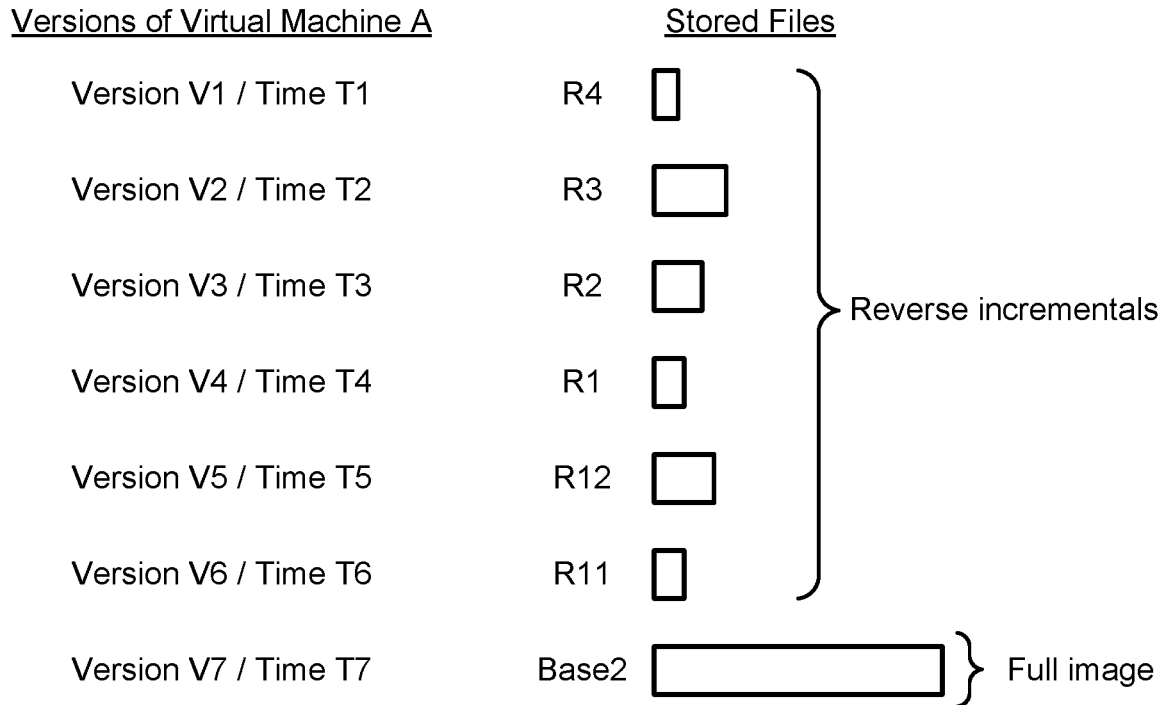

FIG. 2D depicts one embodiment of a set of virtual machine snapshots stored as a second set of files after a rebasing process has been performed using the first set of files in FIG. 2A. The second set of files may be stored using a distributed file system, such as distributed file system 112 in FIG. 1C. The rebasing process may generate new files R12, R11, and Base2 associated with versions V5-V7 of Virtual Machine A in order to move a full image closer to a more recent version of Virtual Machine A and to improve the reconstruction time for the more recent versions of Virtual Machine A. The data associated with the full image Base in FIG. 2A may be equivalent to the new file R12 patched over R11 and the full image Base2. Similarly, the data associated with the full image Base2 may be equivalent to the forward incremental F2 in FIG. 2A patched over F1 and the full image Base in FIG. 2A.

The process of moving the full image snapshot for the set of virtual machine snapshots to correspond with the most recent snapshot version may be performed in order to shorten or reduce the chain lengths for the newest or most recent snapshots, which may comprise the snapshots of Virtual Machine A that are the most likely to be accessed. In some cases, a rebasing operation (e.g., that moves the full image snapshot for a set of virtual machine snapshots to correspond with the most recent snapshot version) may be triggered when a number of forward incremental files is greater than a threshold number of forward incremental files for a snapshot chain (e.g., more than 200 forward incremental files). In other cases, a rebasing operation may be triggered when the total disk size for the forward incremental files exceeds a threshold disk size (e.g., is greater than 200 GB) or is greater than a threshold percentage (e.g., is greater than 20%) of the base image for the snapshot chain.

In some cases, the rebasing process may be part of a periodic rebasing process that is applied at a rebasing frequency (e.g., every 24 hours) to each virtual machine of a plurality of protected virtual machines to reduce the number of forward incremental files that need to be patched to a base image in order to restore the most recent version of a virtual machine. Periodically reducing the number of forward incremental files may reduce the time to restore the most recent version of the virtual machine as the number of forward incremental files that need to be applied to a base image to generate the most recent version may be limited. In one example, if a rebasing process is applied to snapshots of a virtual machine every 24 hours and snapshots of the virtual machine are acquired every four hours, then the number of forward incremental files may be limited to at most five forward incremental files.

As depicted, the second set of files includes a set of reverse incrementals (R11-R12 and R1-R4) and a full image (Base2). The set of virtual machine snapshots includes the different versions of the virtual machine (versions V1-V7 of Virtual Machine A) captured at the different points in time (times T1-T7) depicted in FIG. 2A. In some cases, the file size of the reverse incremental R2 may be substantially less than the file size of the base image Base2. The reverse incremental R2 corresponds with version V2 of Virtual Machine A and the base image Base2 corresponds with version V7 of Virtual Machine A. In this case, the most recent version of Virtual Machine A (i.e., the most recent restore point for Virtual Machine A) comprises a full image. To generate earlier versions of Virtual Machine A, reverse incrementals may be applied to (or patched to) the full image Base2. Subsequent versions of Virtual Machine A may be stored as forward incrementals that depend from the full image Base2.

In one embodiment, a rebasing process may be applied to a first set of files associated with a virtual machine in order to generate a second set of files to replace the first set of files. The first set of files may include a first base image from which a first version of the virtual machine may be derived and a first forward incremental file from which a second version of the virtual machine may be derived. The second set of files may include a second reverse incremental file from which the first version of the virtual machine may be derived and a second base image from which the second version of the virtual machine may be derived. During the rebasing process, data integrity checking may be performed to detect and correct data errors in the files stored in a file system, such as distributed file system 112 in FIG. 1C, that are read to generate the second set of files.

FIG. 2E depicts one embodiment of a merged file for generating version V7 of Virtual Machine A using the second set of files depicted in FIG. 2D. The merged file includes a first pointer (pBase2) that references the base image Base2 (e.g., via the path /snapshots/VM_A/s7/s7.full). In this case, the full image of version V7 of Virtual Machine A may be directly acquired without patching forward incrementals or reverse incrementals to the base image Base2 corresponding with version V7 of Virtual Machine A.

FIG. 2F depicts one embodiment of a merged file for generating version V2 of Virtual Machine A using the second set of files depicted in FIG. 2D. The merged file includes a first pointer (pBase2) that references the base image Base2 (e.g., via the path /snapshots/VM_A/s7/s7.full), a second pointer (pR11) that references the reverse incremental R11 (e.g., via the path /snapshots/VM_A/s6/s6.delta), a third pointer (pR12) that references the reverse incremental R12 (e.g., via the path /snapshots/VM_A/s5/s5.delta), a fourth pointer (pR1) that references the reverse incremental R1 (e.g., via the path /snapshots/VM_A/s4/s4.delta), a fifth pointer (pR2) that references the reverse incremental R2 (e.g., via the path /snapshots/VM_A/s3/s3.delta), and a sixth pointer (pR3) that references the reverse incremental R3 (e.g., via the path /snapshots/VM_A/ s2/s2.delta). In one embodiment, to generate the full image of version V2 of Virtual Machine A, the base image may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and then the data changes associated with reverse incremental R3 may be applied to the fourth intermediate image to generate the full image of version V2 of Virtual Machine A.

Figure 3A:
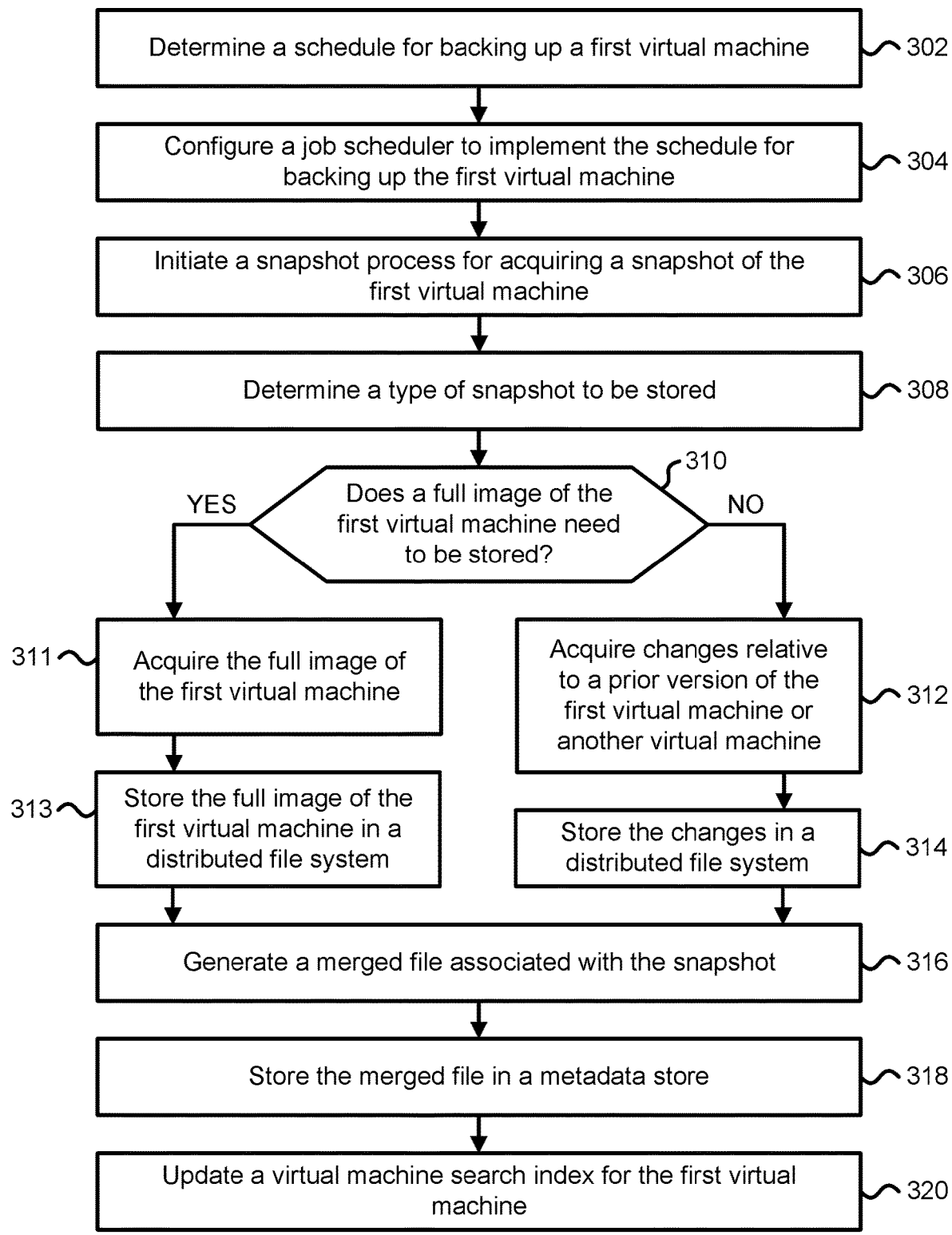
FIG. 3A is a flowchart describing one embodiment of a process for managing and storing virtual machine snapshots using a data storage system.

FIG. 3A is a flowchart describing one embodiment of a process for managing and storing virtual machine snapshots using a data storage system. In one embodiment, the process of FIG. 3A may be performed by a storage appliance, such as storage appliance 170 in FIG. 1A.

In step 302, a schedule for backing up a first virtual machine is determined. In one example, the schedule for backing up the first virtual machine may comprise periodically backing up the first virtual machine every four hours. The schedule for backing up the first virtual machine may be derived from a new backup, replication, and archival policy or backup class assigned to the first virtual machine. In step 304, a job scheduler is configured to implement the schedule for backing up the first virtual machine. In one example, a distributed job scheduler, such as distributed job scheduler 108 in FIG. 1C, may be configured to schedule and run processes for capturing and storing images of the first virtual machine over time according the schedule. In step 306, a snapshot process for acquiring a snapshot of the first virtual machine is initiated. The snapshot process may send an instruction to a virtualized infrastructure manager, such as virtualization manager 169 in FIG. 1A, that requests data associated with the snapshot of the first virtual machine. In step 308, a type of snapshot to be stored is determined. The type of snapshot may comprise a full image snapshot or an incremental snapshot. In some cases, a full image snapshot may be captured and stored in order to serve as an anchor snapshot for a new snapshot chain. Versions of the first virtual machine may be stored using one or more independent snapshot chains, wherein each snapshot chain comprises a full image snapshot and one or more incremental snapshots. One embodiment of a process for determining the type of snapshot to be stored (e.g., storing either a full image snapshot or an incremental snapshot) is described later in reference to FIG. 3B.

In step 310, it is determined whether a full image of the first virtual machine needs to be stored in order to store the snapshot of the first virtual machine. The determination of whether a full image is required may depend on whether a previous full image associated with a prior version of the first virtual machine has been acquired. The determination of whether a full image is required may depend on the determination of the type of snapshot to be stored in step 308. If a full image needs to be stored, then step 311 is performed. Otherwise, if a full image does not need to be stored, then step 312 is performed. In step 311, the full image of the first virtual machine is acquired. The full image of the first virtual machine may correspond with a file or one or more data chunks. In step 312, changes relative to a prior version of the first virtual machine or relative to another virtual machine (e.g., in the case that the first virtual machine comprises a dependent virtual machine whose snapshots derive from a full image snapshot of a second virtual machine different from the first virtual machine) are acquired. The changes relative to the prior version of the first virtual machine or relative to a version of a different virtual machine may correspond with a file or one or more data chunks. In step 313, the full image of the first virtual machine is stored using a distributed file system, such as distributed file system 112 in FIG. 1C. In step 314, the changes relative to the prior version of the first virtual machine or relative to another virtual machine are stored using a distributed file system, such as distributed file system 112 in FIG. 1C. In one embodiment, the full image of the first virtual machine may be stored using a first storage device of a first type (e.g., a HDD) and the changes relative to the prior version of the first virtual machine may be stored using a second storage device of a second type (e.g., an SSD).

In some embodiments, snapshots of the first virtual machine may be ingested at a snapshot capture frequency (e.g., every 30 minutes) by a data storage system. When a snapshot of the first virtual machine is ingested, the snapshot may be compared with other snapshots stored within the data storage system in order to identify a candidate snapshot from which the snapshot may depend. In one example, a scalable approximate matching algorithm may be used to identify the candidate snapshot whose data most closely matches the data associated with the snapshot or to identify the candidate snapshot whose data has the fewest number of data differences with the snapshot. In another example, an approximate matching algorithm may be used to identify the candidate snapshot whose data within a first portion of the candidate snapshot most closely matches data associated with a first portion of the snapshot. In some cases, a majority of the data associated with the snapshot and the candidate snapshot may be identical (e.g., both the snapshot and the candidate snapshot may be associated with virtual machines that use the same operating system and have the same applications installed). Once the candidate snapshot has been identified, then data differences (or the delta) between the snapshot and the candidate snapshot may be determined and the snapshot may be stored based on the data differences. In one example, the snapshot may be stored using a forward incremental file that includes the data differences between the snapshot and the candidate snapshot. The forward incremental file may be compressed prior to being stored within a file system, such as distributed file system 112 in FIG. 1C.

In step 316, a merged file associated with the snapshot is generated. The merged file may reference one or more files or one or more data chunks that have been acquired in either step 311 or step 312. In one example, the merged file may comprise a file or a portion of a file that includes pointers to the one or more files or the one or more data chunks. In step 318, the merged file is stored in a metadata store, such as distributed metadata store 110 in FIG. 1C. In step 320, a virtual machine search index for the first virtual machine is updated. The virtual machine search index for the first virtual machine may include a list of files that have been stored in the first virtual machine and a version history for each of the files in the list. In one example, the virtual machine search index for the first virtual machine may be updated to include new files that have been added to the first virtual machine since a prior snapshot of the first virtual machine was taken and/or to include updated versions of files that were previously stored in the first virtual machine.

Figure 3B:
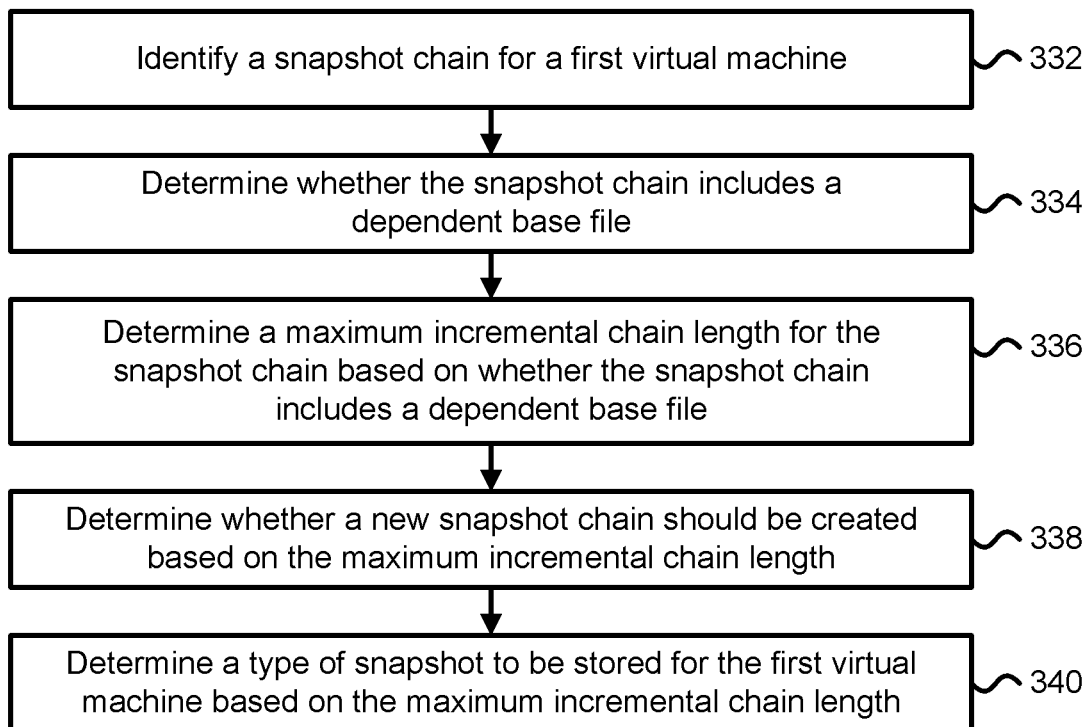
FIG. 3B is a flowchart describing one embodiment of a process for determining the type of snapshot to be stored using a data storage system.

FIG. 3B is a flowchart describing one embodiment of a process for determining the type of snapshot to be stored using a data storage system. The process described in FIG.

3B is one example of a process for implementing step 308 in FIG. 3A. In one embodiment, the process of FIG. 3B may be performed by a storage appliance, such as storage appliance 170 in FIG. 1A.

In step 332, a snapshot chain for a first virtual machine is identified. The snapshot chain may comprise a full image snapshot for the first virtual machine and one or more incremental snapshots that derive from the full image snapshot. Backed-up versions of the first virtual machine may correspond with one or more snapshot chains. Each of the one or more snapshot chains may include a full image snapshot or a base image from which incremental snapshots may derive.

In step 334, it is determined whether the snapshot chain includes a dependent base file. In this case, the first virtual machine may comprise a dependent virtual machine that has snapshots that derive from a full image snapshot of a different virtual machine. In one embodiment, the first virtual machine and the different virtual machine from which the first virtual machine depends may each have different virtual machine configuration files for storing configuration settings for the virtual machines. In one example, the first virtual machine may have a first number of virtual processors (e.g., two processors) and the different virtual machine may have a second number of virtual processors different from the first number of virtual processors (e.g., four processors). In another example, the first virtual machine may have a first virtual memory size (e.g., 1 GB) and the different virtual machine may have a second virtual memory size different from the first virtual memory size (e.g., 2 GB). In another example, the first virtual machine may run a first guest operating system and the different virtual machine may run a second guest operating system different from the first guest operating system.

In step 336, a maximum incremental chain length for the snapshot chain is determined based on whether the snapshot chain includes a dependent base file. In one example, if the first virtual machine comprises a dependent virtual machine, then the maximum incremental chain length may be set to a maximum length of 200 snapshots; however if the first virtual machine is independent and is not a dependent virtual machine, then the maximum incremental chain length may be set to a maximum length of 500 snapshots.

In one embodiment, the maximum incremental chain length for the snapshot chain may be determined based on an age of the backed-up versions within the snapshot chain. In one example, the maximum incremental chain length for a snapshot chain storing versions of the first virtual machine that are less than one year old may comprise a maximum incremental chain length of 100 incrementals, while the maximum incremental chain length for a snapshot chain storing versions of the first virtual machine that are more than one year old may comprise a maximum incremental chain length of 200 incrementals.

In step 338, it is determined whether a new snapshot chain should be created based on the maximum incremental chain length. In step 340, a type of snapshot to be stored for the first virtual machine is determined based on the maximum incremental chain length. The type of snapshot may comprise either a full image snapshot or an incremental snapshot. In one embodiment, if the snapshot chain for the first virtual machine exceeds the maximum incremental chain length for the snapshot chain, then the type of snapshot to be stored for the first virtual machine may comprise a full image snapshot. In this case, an additional snapshot chain may be created for the first virtual machine.

In some embodiments, the number of snapshots in a snapshot chain may decrease over time as older versions of a virtual machine are consolidated, archived, deleted, or moved to a different storage domain (e.g., to cloud storage) depending on the data backup and archiving schedule for the virtual machine. In some cases, the maximum incremental chain length or the maximum number of snapshots for a snapshot chain may be increased over time as the versions stored by the snapshot chain age. In one example, if the versions of a virtual machine stored using a snapshot chain are all less than one month old, then the maximum incremental chain length may be set to a maximum of 200 incrementals; however, if the versions of the virtual machine stored using the snapshot chain are all greater than one month old, then the maximum incremental chain length may be set to a maximum of 1000 incrementals.

Figure 3C:
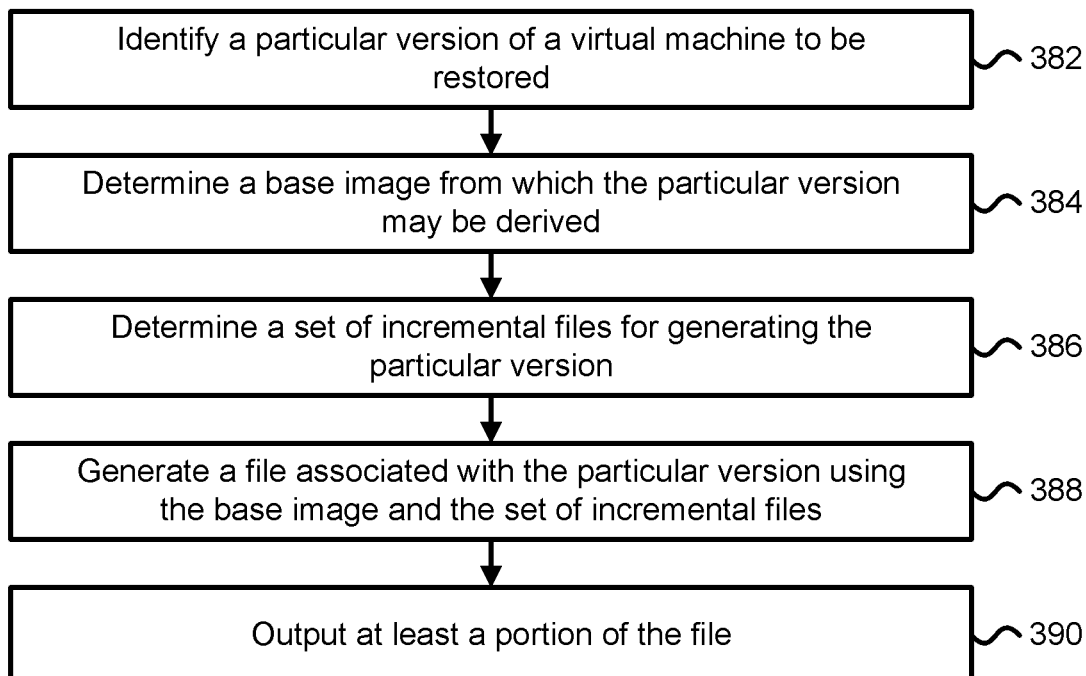
FIG. 3C is a flowchart describing one embodiment of a process for restoring a version of a virtual machine using a data storage system.

FIG. 3C is a flowchart describing one embodiment of a process for restoring a version of a virtual machine using a data storage system. In one embodiment, the process of FIG. 3C may be performed by a storage appliance, such as storage appliance 170 in FIG. 1A.

In step 382, a particular version of a virtual machine to be restored is identified. In step 384, a base image from which the particular version may be derived is determined. In step 386, a set of incremental files for generating the particular version is determined. In one embodiment, the base image and the set of incremental files may be determined from a merged file associated with the particular version of the virtual machine. In some cases, the set of incremental files may include one or more forward incremental files and/or one or more reverse incremental files. In step 388, a file associated with the particular version is generated using the base image and the set of incremental files. The file may be generated by patching the set of incremental files onto the base image. In step 390, at least a portion of the file is outputted. The at least a portion of the file may be electronically transferred to a computing device, such as computing device 154 in FIG. 1A, or to a virtualization manager, such as virtualization manager 169 in FIG. 1A.

In some embodiments, the base image and a subset of the set of incremental files may correspond with a second virtual machine different from the virtual machine. In this case, the base image may comprise the base image for the second virtual machine and the set of incremental files may include a dependent base file that comprises data differences between the base image for the second virtual machine and a previously acquired base image for the virtual machine.

Figures 4A, 4B:
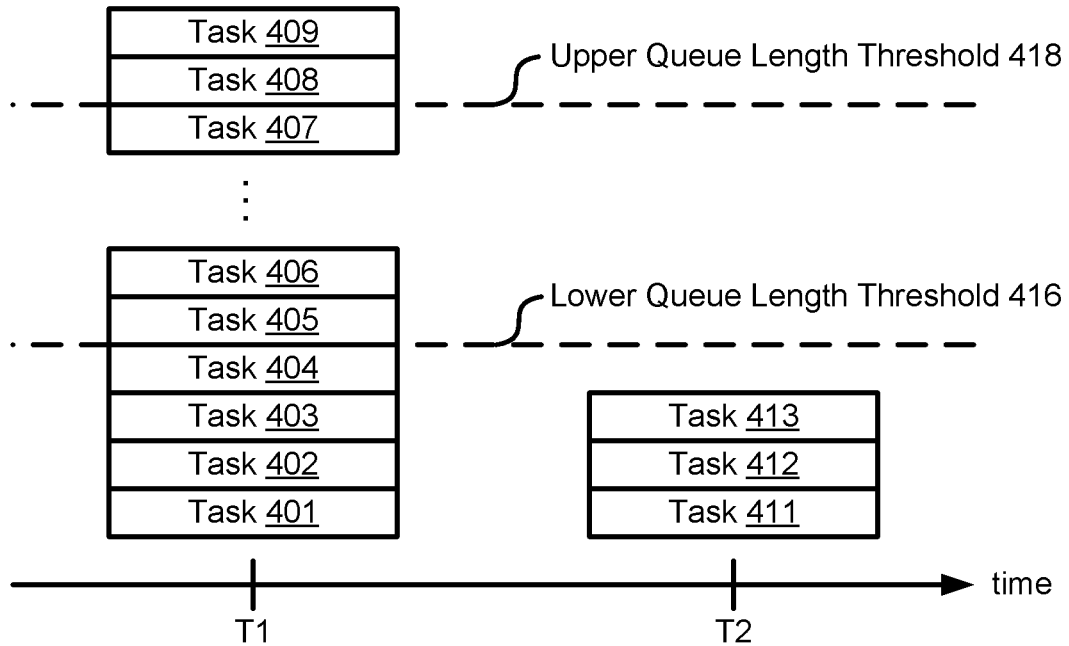
FIG. 4A depicts one embodiment of a task queue associated with a first node of a plurality of nodes at two different points in time.
FIG. 4B depicts one embodiment of a task queue lengths table for storing task queue length information for various nodes within a cluster of data storage nodes.

FIG. 4A depicts one embodiment of a task queue associated with a first node of a plurality of nodes at two different points in time. A job may comprise a sequence of tasks that are to be executed using the plurality of nodes and the task queue may manage the execution of a subset of the tasks for the first node. The task queue may comprise a FIFO and be implemented using a memory, such as an SRAM or a DRAM. The plurality of nodes may comprise a cluster of data storage nodes, such as the data storage nodes 141-147 depicted in FIG. 1D. As depicted, the task queue associated with the first node at time T1 includes entries for tasks 401-409 in which task 401 may comprise the next task to be run on the first node (e.g., the task 401 may comprise the task at the head of the task queue) followed by task 402 followed by task 403; task 409 comprises the last task at the back of the task queue at time T1. Tasks 401-404 may reside below a lower queue length threshold 416 (e.g., set to four tasks). Tasks 405-407 may reside between the lower queue length threshold 416 and an upper queue length threshold 418 (e.g., set to seven or ten tasks). Tasks 408-409 may reside above the upper queue length threshold 418. In one embodiment, if the number of tasks within the task queue associated with the first node exceeds the upper queue length threshold 418, then the first node may publish or write its task queue length to a table of task queue lengths. In this case, when the task queue for the first node is overloaded with tasks to run or the task queue length for the task queue is greater than the upper queue length threshold 418, the first node may write to the table of task queue lengths indicating the task queue length for the task queue and a time (or timestamp) at which the table was written with the task queue length for the task queue. The task queue length for the task queue at time T1 may correspond with the nine queued tasks 401-409 to be executed using the first node. The table of task queue lengths may be stored using a distributed metadata store, such as the distributed metadata store 110 in FIG. 1C, and may be read and/or written by any of the plurality of nodes. The table of task queue lengths may comprise a metadata table for storing task queue lengths and/or average task queue lengths for multiple nodes in a cluster of data storage nodes.

As depicted in FIG. 4A, the task queue associated with the first node at time T2 stores entries for tasks 411-413 in which task 411 may comprise the next task to be run on the first node followed by task 412 followed by task 413. The task queue length for the task queue at time T2 may correspond with the three queued tasks 411-413 to be executed using the first node. In this case, the task queue length for the task queue at time T2 is less than the lower queue length threshold 416. In one embodiment, if the number of task entries within the task queue associated with the first node is less than the lower queue length threshold 416, then the first node may attempt to steal tasks or take tasks from other nodes within the plurality of nodes.

In some cases, the upper queue length threshold 418 and the lower queue length threshold 416 may be fixed over time (e.g., set by an end user of an integrated data management and storage system). In other cases, the upper queue length threshold 418 and/or the lower queue length threshold 416 may vary over time based on the number of the plurality of nodes and/or the number of tasks queued for the plurality of nodes. The upper queue length threshold 418 may be set such that the upper queue length threshold 418 is a particular multiple of the average number of tasks queued per node (e.g., is three times the average number of tasks queued per node).

The task queue lengths for multiple nodes within the cluster of data storage nodes may be acquired from a table that is updated periodically with the task queue lengths for the multiple nodes within the cluster. The table of task queue lengths may be stored using a distributed metadata store. The table of task queue lengths may be updated or written to when a node within the cluster becomes overloaded, has a task queue length greater than a queue length threshold (e.g., greater than the upper queue length threshold), or has a task queue that stores more than a threshold number of tasks to be executed (e.g., has more than twenty tasks to be executed). The table of task queue lengths may also store time stamp information for when each task queue length entry was made.

FIG. 4B depicts one embodiment of a task queue lengths table for storing task queue length information for various nodes within a cluster of data storage nodes. As depicted, the table includes four entries corresponding with nodes Node1, Node3, Node4, and Node7. Each row in the table includes the task queue length for a particular node, the average task queue length for the particular node over a particular period of time (e.g., the average task queue length over the past ten minutes), and a timestamp for when the task queue length information was written to the table. In one embodiment, each entry in the task queue lengths table may have been entered in response to a particular node within the cluster of data storage nodes detecting that a task queue length for a task queue associated with the particular node was greater than an upper queue length threshold. In another embodiment, each node within the cluster of data storage nodes may periodically publish or write task queue length information to the task queue lengths table (e.g., each node may provide updated task queue length information every ten minutes).

Figure 5A:
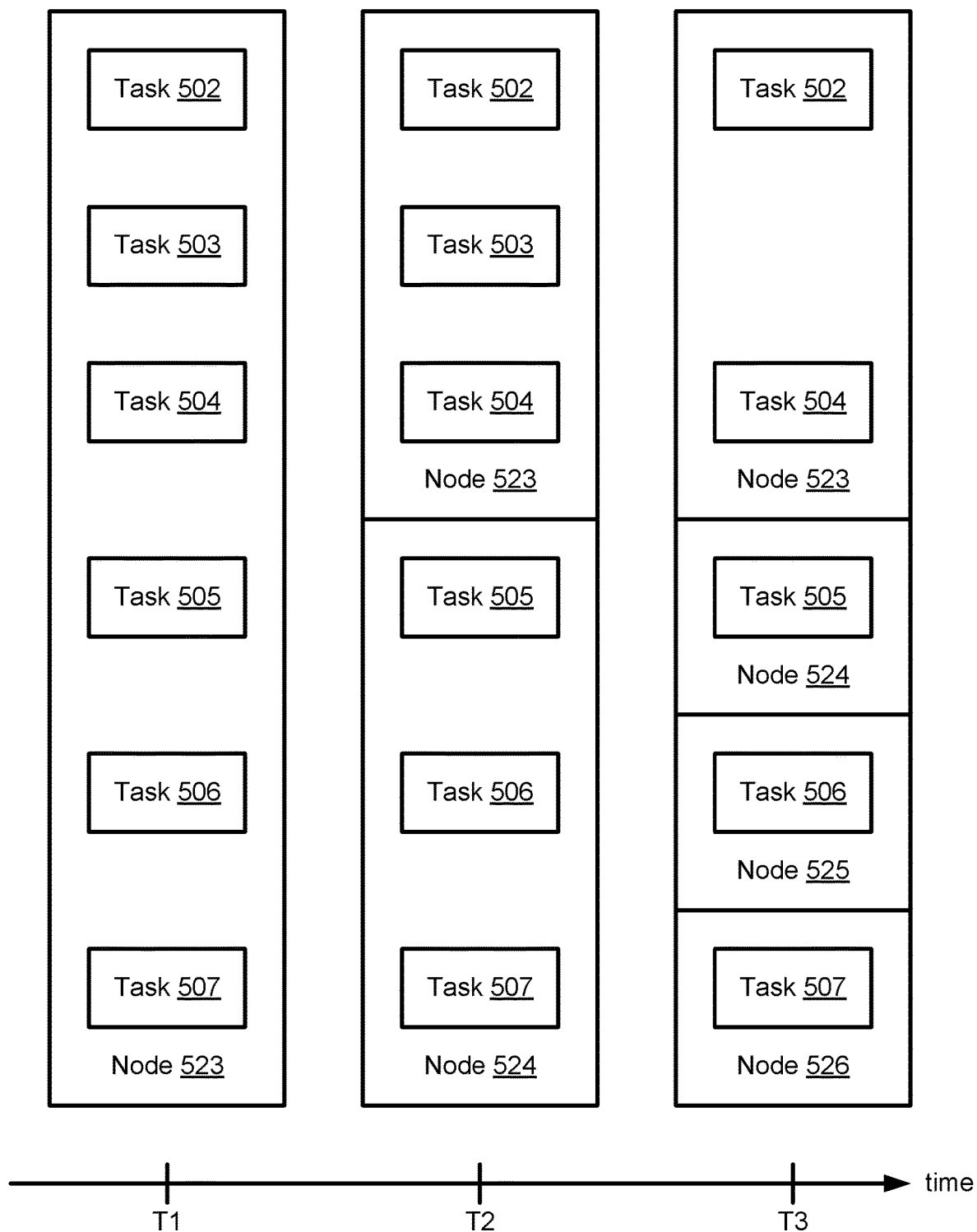
FIG. 5A depicts one embodiment of node assignments for a plurality of tasks associated with a job being executed using a plurality of data storage nodes.

FIG. 5A depicts one embodiment of node assignments for a plurality of tasks associated with a job to be run using a plurality of data storage nodes including nodes 523-526. The job may comprise one of the jobs performed by a data management and storage system, such as a snapshot job to acquire and store a real or virtual machine snapshot or a garbage collection job to free-up disk storage space within the plurality of data storage nodes. The job may require a sequence of tasks to be performed including tasks 502-507. The job may comprise the parent job of the parallelizable child tasks 502-507. The parent job may wait for the parallelizable child tasks 502-507 to complete before progressing or before executing other child tasks. Results from the parallelizable child tasks 502-507 may be stored in a configuration file or a temporary file and may be aggregated after all of the child tasks 502-507 have been completed.

The plurality of data storage nodes may comprise a cluster of data storage nodes, such as the data storage nodes 141-147 depicted in FIG. 1D. As depicted, prior to time T1, a distributed job scheduler, such as distributed job scheduler 108 in FIG. 1C, may identify the job to be executed and identify parallelizable tasks 502-507 to be executed using the plurality of data storage nodes. The parallelizable tasks 502-507 may be classified as parallelizable via a task type assigned to the tasks within the computer program code for the job. In one example, the task 502 may be assigned a ParallelizableReversibleTask task type. The distributed job scheduler may execute the parallelizable tasks 502-507 using one or more nodes of the plurality of data storage nodes and the nodes selected by the distributed job scheduler to execute the parallelizable tasks 502-507 may be adjusted or reassigned during execution of the parallelizable tasks 502-507 or after the tasks 502-507 have already been added to task queues for the plurality of data storage nodes.

At time T1, the distributed job scheduler may assign all of the parallelizable tasks 502-507 to node 523. Node 523 may correspond with node 141 in FIG. 1D. The determination to run each of the tasks 502-507 on a single node may be made based on a time remaining to complete the job, an estimated time to complete the job, and a number of healthy nodes within the cluster. The estimated time to complete the job may be determined based on a historical average for the completion of previously run jobs that have the same job type as the job. In one example, the job may correspond with a snapshot job type in which a snapshot of a real or virtual machine is acquired and stored. The job may comprise a snapshot job for the real or virtual machine and the historical average for the completion of previously run jobs may be set based on the average amount of time that the last five snapshots of the real or virtual machine took to complete. If the number of nodes within the cluster has increased or decreased, then the historical average for the completion of previously run jobs of the same job type may only take into account the prior snapshots of the real or virtual machine that occurred with the same number of healthy nodes as has been currently identified prior to executing the job. In another example, the job may correspond with a rebasing operation for a snapshot chain and the historical average for the completion of previously run jobs of the same job type may be set based on the average length of time for performing the two most recent rebasing operations for the same snapshot chain.

The number of healthy nodes within the cluster may be determined based on the number of nodes within the cluster that are available to execute the tasks 502-507, the number of nodes within the cluster with a task queue length less than an upper task queue length threshold, the number of nodes within the cluster with at least a threshold amount of available disk space (e.g., that have at least 50 GB of available disk space), the number of nodes within the cluster with at least a threshold amount of memory (e.g., that have at least 1 GB of RAM), and/or the number of nodes within the cluster that are capable of performing at least a threshold number of input/output operations per second (IOPS). After the number of healthy nodes within the cluster has been determined, then the maximum number of nodes to which the tasks 502-507 may be assigned may be set as the smallest of the number of healthy nodes or the maximum parallelism limit for the number of nodes. For example, if the maximum parallelism limit is set to ten and the number of healthy nodes is four, then the tasks 502-507 may be assigned to the four healthy nodes. In some cases, the maximum parallelism limit for the number of nodes may be set as the total number of nodes within the cluster divided by two or be set to a fixed value (e.g., ten nodes).

At time T2, the distributed job scheduler may detect that the time remaining to complete the job has fallen below a threshold amount of time (e.g., there is less than thirty minutes left to complete the job) or that the time remaining to complete the job minus the estimated time to complete the job has fallen below a threshold amount of time. The time to complete the job may be set to meet a particular recovery point objective or may be specified by an end user of a data management and storage system. In response to detecting that the time remaining to complete the job has fallen below a threshold amount of time or that the time remaining to complete the job minus the estimated time to complete the job has fallen below the threshold amount of time, the distributed job scheduler may move tasks 505-507 to node 524. Node 524 may correspond with node 147 in FIG. 1D. The distributed job scheduler may determine that although the tasks 505-507 were assigned to node 523 at time T1, node 523 has not started executing the tasks 505-507 or that the tasks 505-507 are not close to completion (e.g., that the tasks are not expected to be completed for another hour). The distributed job scheduler may determine that node 523 has not yet started executing the tasks 505-507 based on entries for tasks 505-507 within the task queue for node 523. The distributed job scheduler may cancel tasks 505-507 from node 523 and add tasks 505-507 to node 524 for execution. In one example, the distributed job scheduler may remove the entries for tasks 505-507 from the task queue for node 523 and add entries for tasks 505-507 to the task queue for node 524. Thus, at time T2, tasks 502-504 have been assigned to node 523 and tasks 505-507 have been assigned to node 524.

In some cases, node 524 may comprise a node with a higher average IOPS than node 523 and the distributed job scheduler may only assign tasks 505-507 to one or more nodes with a higher average IOPS than node 523. In other cases, node 524 may comprise a node with a greater amount of available disk space or memory than node 523 and the distributed job scheduler may only assign tasks 505-507 to one or more nodes with a greater amount of available disk space or memory than node 523. In other cases, the distributed job scheduler may only assign tasks 505-507 to one or more nodes that have a task queue length less than a lower queue length threshold, such as the lower queue length threshold 416 in FIG. 4A.

When assigning tasks to nodes, the distributed job scheduler may specify the maximum amount of disk space or memory to be allocated for the child tasks. In some embodiments, the distributed job scheduler may increase the maximum amount of disk space or memory allocated to child tasks running on a particular node if there is less than a threshold amount of time remaining to complete the job. In other embodiments, the distributed job scheduler may decrease the maximum amount of disk space or memory allocated to child tasks running on a particular node if there is more than a threshold amount of time remaining to complete the job. The reduction in the maximum amount of disk space or memory allocated to the child tasks running on the particular node may improve the performance of other tasks running on the particular node.

At time T3, the distributed job scheduler may detect that the time remaining to complete the job has fallen below a second threshold amount of time (e.g., there is less than ten minutes remaining to complete the job) or that the time remaining to complete the job minus the estimated time to complete the job has fallen below the second threshold amount of time. In response to detecting that the time remaining to complete the job has fallen below the second threshold amount of time or that the time remaining to complete the job minus the estimated time to complete the job has fallen below the second threshold amount of time, the distributed job scheduler may move task 506 to node 525 and task 507 to node 526. Task 505 may remain executing on node 524. Task 503 may have completed execution prior to time T3 and results of task 503 or data generated by task 503 may be stored using a configuration file or a temporary file. The data generated by task 503 may be stored using a distributed file system, such as distributed file system 112 in FIG. 1C. Thus, at time T3, tasks 502 and 504 have been assigned to node 523, task 505 has been assigned to node 524, task 506 has been assigned to node 525, and task 507 has been assigned to node 526.

Figure 5B:
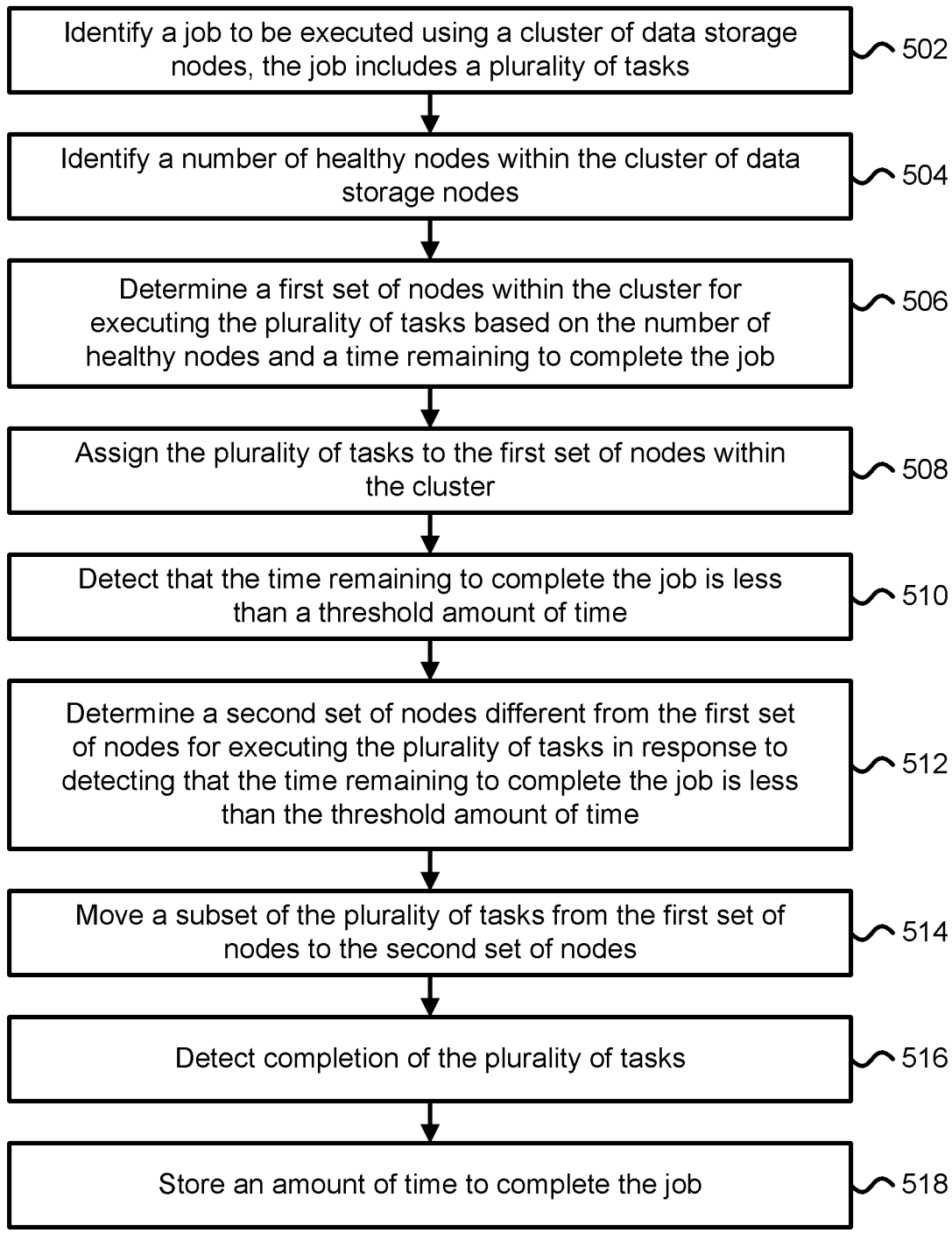
FIG. 5B is a flowchart describing one embodiment of a process for assigning child tasks to nodes within a cluster of data storage nodes and dynamically adjusting the node assignments of the child tasks over time.

FIG. 5B is a flowchart describing one embodiment of a process for assigning child tasks to nodes within a cluster of data storage nodes and dynamically adjusting the node assignments of the child tasks over time. In one embodiment, the process of FIG. 5B may be performed by a storage appliance, such as storage appliance 170 or storage appliance 140 in FIG. 1A. The process of FIG. 5B may be performed by a distributed job scheduler, such as distributed job scheduler 108 in FIG. 1C.

In step 502, a job to be executed using a cluster of data storage nodes is identified. The job may include a plurality of tasks to be performed in order to complete the job. The job may comprise one of a number of jobs that may be executed using the plurality of data storage nodes, such as a snapshot job to capture a snapshot of a real or virtual machine, a garbage collection job, a job for downloading or transferring an electronic file associated with a real or virtual machine, or a job for consolidating one or more snapshots of a real or virtual machine.

In step 504, a number of healthy nodes within the cluster of data storage nodes is identified. In one example, the number of healthy nodes may comprise the total number of nodes within the cluster that are available for executing tasks. In another example, the number of healthy nodes may comprise the number of nodes within the cluster with a task queue length less than ten or less than an upper queue length threshold, such as the upper queue length threshold 418 in FIG. 4A. In another example, the number of healthy nodes may comprise the number of nodes within the cluster with the least 50 GB of available disk space. In another example, the number of healthy nodes may comprise the number of nodes within the cluster with an average IOPS of at least 200K Write/Read IOPS. In another example, the number of healthy nodes may comprise the number of nodes within the cluster with an average of at least 300K random read IOPS and/or 100K random write IOPS.

In step 506, a first set of nodes within the cluster for executing the plurality of tasks is determined based on the number of healthy nodes and/or a time remaining to complete the job. In one example, an estimated time to complete the plurality of tasks may be determined assuming execution on a single node and the estimated time to complete the plurality of tasks may be compared with the time remaining to complete the job. If the estimated time to complete the plurality of tasks is greater than the time remaining to complete the job, then an estimated time to complete the plurality of tasks assuming execution on two or more nodes may be compared with the time remaining to complete the job. In one embodiment, the first set of nodes may comprise a single data storage node. In another embodiment, the first set of nodes may comprise the minimum number of nodes required to complete the plurality of tasks within the time remaining to complete the job. In step 508, the plurality of tasks is assigned to the first set of nodes within the cluster. The plurality of tasks may be added to tasks queues for the first set of nodes.

In step 510, it is detected that the time remaining to complete the job is less than a threshold amount of time. For example, it may be detected that the time remaining to complete the job is less than thirty minutes. In step 512, a second set of nodes different from the first set of nodes for executing the plurality of tasks is determined in response to detecting that the time remaining to complete the job is less than the threshold amount of time. In one example, the second set of nodes may comprise the first set of nodes plus an additional one or more nodes within the cluster. The second set of nodes may comprise twice the number of nodes as the first set of nodes; for example, the first set of nodes may comprise two nodes within the cluster and the second set of nodes may comprise four nodes within the cluster. In step 514, a subset of the plurality of tasks is moved from the first set of nodes to the second set of nodes. The subset of the plurality of tasks may be moved by assigning the subset of the plurality of tasks to the second set of nodes for execution on the second set of nodes and cancelling the subset of the plurality of tasks from the first set of nodes.

Referring to FIG. 5A, at time T2, the plurality of tasks may comprise tasks 502-507, the first set of nodes may comprise node 523, the second set of nodes may comprise node 523 and node 524, and the subset of the plurality of tasks may comprise tasks 505-507. In another example, referring to time T3 in FIG. 5A, the plurality of tasks may comprise tasks 502-507, the first set of nodes may comprise nodes 523-524, the second set of nodes may comprise nodes 523-526, and the subset of the plurality of tasks may comprise tasks 506-507. In step 516, completion of the plurality of tasks is detected. In step 518, an amount of time to complete the job may be stored in response to detecting completion of the job. The amount of time to complete the job may be written to a table in order to compute an average amount of time for completing a job of the same job type. Storing the amount of time to complete the job may allow the distributed job scheduler to estimate the amount of time to complete a future job of the same job type, such as a future job to capture a subsequent snapshot of a virtual machine.

One embodiment of the disclosed technology includes identifying a job corresponding with a plurality of tasks to be executed using a cluster of data storage nodes, identifying a number of healthy nodes within the cluster of data storage nodes, determining a first set of nodes within the cluster for executing the plurality of tasks based on the number of healthy nodes, assigning the plurality of tasks to the first set of nodes for execution on the first set of nodes, detecting that a time remaining to complete the job is less than a threshold amount of time subsequent to assigning the plurality of tasks to the first set of nodes, determining a second set of nodes different from the first set of nodes for executing the plurality of tasks in response to detecting that the time remaining to complete the job is less than the threshold amount of time, assigning a subset of the plurality of tasks to the second set of nodes for execution on the second set of nodes, cancelling the subset of the plurality of tasks from the first set of nodes, and detecting completion of the plurality of tasks subsequent to assigning the subset of the plurality of tasks to the second set of nodes.

One embodiment of the disclosed technology includes a cluster of data storage nodes in communication with one or more processors. The one or more processors configured to identify a job to be executed using the cluster of data storage nodes. The job includes a plurality of tasks. The one or more processors configured to identify a number of healthy nodes within the cluster of data storage nodes and determine a first set of nodes within the cluster for executing the plurality of tasks based on the number of healthy nodes. The one or more processors configured to assign the plurality of tasks to the first set of nodes within the cluster and detect that a time remaining to complete the job is less than a threshold amount of time. The one or more processors configured to determine a second set of nodes different from the first set of nodes for executing the plurality of tasks in response to detection that the time remaining to complete the job is less than the threshold amount of time. The one or more processors configured to assign a subset of the plurality of tasks to the second set of nodes for execution on the second set of nodes and cancel the subset of the plurality of tasks from the first set of nodes. The one or more processors configured to detect completion of the plurality of tasks and store an amount of time required to complete the job in response to detection of the completion of the plurality of tasks.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object oriented programming language such as Java or C++, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for operating a data management system, comprising:
    identifying a job to be executed using a cluster of data storage nodes, the job includes a plurality of tasks;
    identifying a number of healthy nodes within the cluster of data storage nodes;
    determining a first set of nodes within the cluster for executing the plurality of tasks based on the number of healthy nodes;
    assigning the plurality of tasks to the first set of nodes for execution on the first set of nodes;
    detecting that a time remaining to complete the job is less than a threshold amount of time subsequent to assigning the plurality of tasks to the first set of nodes;
    determining a second set of nodes different from the first set of nodes for executing the plurality of tasks in response to detecting that the time remaining to complete the job is less than the threshold amount of time;
    assigning a subset of the plurality of tasks to the second set of nodes for execution on the second set of nodes;
    cancelling the subset of the plurality of tasks from the first set of nodes; and
    detecting completion of the plurality of tasks subsequent to assigning the subset of the plurality of tasks to the second set of nodes.

2. The method of claim 1, wherein:
    the identifying the number of healthy nodes includes determining a number of nodes within the cluster with a task queue length less than a threshold queue length.

3. The method of claim 1, wherein:
    the identifying the number of healthy nodes includes determining a number of nodes within the cluster with at least a threshold amount of available disk space.

4. The method of claim 1, wherein:
    the identifying the number of healthy nodes includes determining a number of nodes within the cluster with at least a threshold number of random read input/output operations per second.

5. The method of claim 1, wherein:
    the determining the first set of nodes within the cluster includes identifying a number of nodes within the cluster equal to the minimum of the number of healthy nodes or a maximum parallelism limit for the number of nodes running the plurality of tasks at the same time.

6. The method of claim 1, wherein:
    the determining the second set of nodes includes identifying nodes within the cluster with a greater number of random read input/output operations per second than the first set of nodes.

7. The method of claim 1, further comprising:
    periodically computing the time remaining to complete the job;
    comparing the time remaining to complete the job with an estimated time to complete the job; and
    storing an amount of time to complete the job in response to detecting completion of the plurality of tasks.

8. The method of claim 1, wherein:
    the detecting that the time remaining to complete the job is less than the threshold amount of time includes determining the time remaining to complete the job based on a recovery point objective, determining an estimated time to complete the job based on completion times for one or more previously run jobs, and comparing the estimated time to complete the job with the time remaining to complete the job.

9. The method of claim 8, wherein:
    the job comprises a snapshot job for capturing a snapshot of a virtual machine; and
    the determining the estimated time to complete the job comprises determining an average amount of time for completing prior snapshot jobs that captured prior snapshots of the virtual machine.

10. The method of claim 1, wherein:
    the second set of nodes includes the first set of nodes and one or more additional nodes within the cluster.

11. A data management system, comprising:
    a cluster of data storage nodes; and
    one or more processors configured to identify a job to be executed using the cluster of data storage nodes, the job includes a plurality of tasks, the one or more processors configured to identify a number of healthy nodes within the cluster of data storage nodes and determine a first set of nodes within the cluster for executing the plurality of tasks based on the number of healthy nodes, the one or more processors configured to assign the plurality of tasks to the first set of nodes within the cluster and detect that a time remaining to complete the job is less than a threshold amount of time, the one or more processors configured to determine a second set of nodes different from the first set of nodes for executing the plurality of tasks in response to detection that the time remaining to complete the job is less than the threshold amount of time, the one or more processors configured to assign a subset of the plurality of tasks to the second set of nodes for execution on the second set of nodes and cancel the subset of the plurality of tasks from the first set of nodes, the one or more processors configured to detect completion of the plurality of tasks and store an amount of time required to complete the job in response to detection of the completion of the plurality of tasks.

12. The data management system of claim 11, wherein:
the one or more processors configured to identify the number of healthy nodes based on a number of nodes within the cluster with a task queue length less than a threshold queue length.

13. The data management system of claim 11, wherein:
the one or more processors configured to identify the number of healthy nodes based on a number of nodes within the cluster with at least a threshold amount of available disk space.

14. The data management system of claim 11, wherein:
the one or more processors configured to identify the number of healthy nodes based on a number of nodes within the cluster with at least a threshold number of random write input/output operations per second.

15. The data management system of claim 11, wherein:
the second set of nodes is determined based on a number of random read input/output operations per second for each node within the first set of nodes.

16. The data management system of claim 11, wherein:
the one or more processors configured to periodically determine the time remaining to complete the job and compare the time remaining to complete the job with an estimated time to complete the job.

17. The data management system of claim 11, wherein:
the one or more processors configured to determine the time remaining to complete the job based on a recovery point objective and compare an estimated time to complete the job with the time remaining to complete the job.

18. The data management system of claim 17, wherein:
the job comprises a snapshot job for capturing a snapshot of a virtual machine; and
the one or more processors configured to compute the estimated time to complete the job based on an average amount of time for completing prior snapshot jobs that captured prior snapshots of the virtual machine.

19. The data management system of claim 17, wherein:
the job comprises a snapshot job for capturing a snapshot of a computing machine; and
the one or more processors configured to determine the estimated time to complete the job based on a previous completion time for capturing a previous snapshot of the computing machine.

20. One or more storage devices containing processor readable code for programming one or more processors to perform a method for operating a data management system, the processor readable code comprising:
processor readable code configured to identify a job to be executed using a cluster of data storage nodes, the job includes a plurality of tasks;
processor readable code configured to identify a number of healthy nodes within the cluster of data storage nodes based on a number of nodes within the cluster with a task queue length less than a threshold queue length;
processor readable code configured to determine a first set of nodes within the cluster for executing the plurality of tasks based on the number of healthy nodes;
processor readable code configured to assign the plurality of tasks to the first set of nodes within the cluster;
processor readable code configured to determine a time remaining to complete the job;
processor readable code configured to detect that the time remaining to complete the job is less than a threshold amount of time subsequent to assignment of the plurality of tasks to the first set of nodes;
processor readable code configured to determine a second set of nodes different from the first set of nodes for executing the plurality of tasks in response to detection that the time remaining to complete the job is less than the threshold amount of time;
processor readable code configured to determine a subset of the plurality of tasks to be moved from the first set of nodes to the second set of nodes for execution on the second set of nodes;
processor readable code configured to assign the subset of the plurality of tasks to the second set of nodes for execution on the second set of nodes;
processor readable code configured to delete the subset of the plurality of tasks from the first set of nodes; and
processor readable code configured to detect completion of the plurality of tasks subsequent to assignment of the subset of the plurality of tasks to the second set of nodes.

* * * * *